US012091284B2

(12) United States Patent
Liebetrau

(10) Patent No.: US 12,091,284 B2
(45) Date of Patent: Sep. 17, 2024

(54) ELEVATOR SYSTEM

(71) Applicant: Inventio AG, Hergiswil (CH)

(72) Inventor: Christoph Liebetrau, Menziken (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/003,161

(22) PCT Filed: Jun. 23, 2021

(86) PCT No.: PCT/EP2021/067065

§ 371 (c)(1),
(2) Date: Dec. 23, 2022

(87) PCT Pub. No.: WO2022/002703

PCT Pub. Date: Jan. 6, 2022

(65) Prior Publication Data

US 2023/0257230 A1 Aug. 17, 2023

(30) Foreign Application Priority Data

Jun. 30, 2020 (EP) .................................... 20183131

(51) Int. Cl.
*B66B 3/02* (2006.01)
*B66B 1/46* (2006.01)
*B66B 13/30* (2006.01)

(52) U.S. Cl.
CPC ............ *B66B 3/023* (2013.01); *B66B 13/303* (2013.01); *B66B 1/468* (2013.01); *B66B 2201/463* (2013.01)

(58) Field of Classification Search
CPC .. B66B 3/023; B66B 13/303; B66B 2201/463
See application file for complete search history.

(56) References Cited

U.S. PATENT DOCUMENTS

| | | | | | |
|---|---|---|---|---|---|
| 4,032,882 | A | * | 6/1977 | Mandel | B66B 3/023 340/332 |
| 5,587,567 | A | * | 12/1996 | Winter | B66B 1/465 200/600 |
| 6,116,381 | A | | 9/2000 | Jalbert | |

FOREIGN PATENT DOCUMENTS

| | | | | | |
|---|---|---|---|---|---|
| CN | 2885803 | Y | * | 4/2007 | |
| CN | 203284020 | U | * | 11/2013 | |
| CN | 110194400 | A | * | 9/2019 | B66B 1/461 |
| DE | 112013004963 | T5 | * | 7/2015 | B66B 13/26 |

(Continued)

*Primary Examiner* — Diem M Tran

(74) *Attorney, Agent, or Firm* — William J. Clemens; Shumaker, Loop & Kendrick, LLP

(57) ABSTRACT

A landing door of an elevator system has a door leaf equipped with an integrated floor display that indicates to a person the floor at which an elevator car approaching the floor of departure is currently located. The door leaf of the landing door has a wall element made of sheet metal, the floor display having at least one controllable light source arranged behind the wall element, and a cover layer. The wall element has a display segment with a plurality of light passage openings, the light passage openings forming a perforated screen structure. The cover layer functions such that after the light source is activated to display the desired floor information, light from the light source penetrates through the light passage openings and the cover layer to the outside and when the light source is deactivated, the cover layer does not let light through to the outside.

15 Claims, 6 Drawing Sheets

(56) References Cited

FOREIGN PATENT DOCUMENTS

| | | | | | |
|---|---|---|---|---|---|
| EP | 1609753 | A1 | | 12/2005 | |
| JP | S5296861 | U | | 7/1977 | |
| JP | H02282174 | A | | 11/1990 | |
| JP | H06171850 | A | | 6/1994 | |
| JP | H11246138 | A | | 9/1999 | |
| JP | 2003335469 | A | * | 11/2003 | ............... B66B 3/00 |
| JP | 2009096584 | A | * | 5/2009 | |
| KR | 20120058707 | A | | 6/2012 | |
| KR | 101870568 | B1 | | 6/2018 | |
| WO | 2014067895 | A1 | | 5/2014 | |
| WO | WO-2017115099 | A1 | * | 7/2017 | ........... B23K 26/362 |
| WO | WO-2019043763 | A1 | * | 3/2019 | |
| WO | 2019171560 | A1 | | 9/2019 | |

* cited by examiner

ELEVATOR SYSTEM

FIELD

The invention relates to an elevator system. The elevator system for conveying persons or goods has an elevator car that can be moved in an elevator shaft between floors. At least one landing door for closing the elevator shaft is provided on at least one floor. The invention further relates to a door leaf for such a landing door.

BACKGROUND

Elevator systems for conveying persons and goods have been known and in common use for a long time. Call detection units for inputting a floor call are frequently arranged on the floors. After a person has made a floor call from a floor of departure, the elevator car travels to this floor. A floor display, generally integrated in the door frame of the landing door, indicates to the person the floor at which the elevator car approaching the floor of departure is currently located.

SUMMARY

It is an object of the present invention to provide an elevator system that has an improved or alternative floor display.

This and other objects are achieved according to the invention with an elevator system that has the features described below. The elevator system for conveying persons or goods can comprise an elevator car that can be moved in an elevator shaft between floors. The elevator system further comprises a landing door comprising a door leaf, via which landing door the elevator car is accessible from the floor. The elevator system can have an elevator control unit for operating the elevator system, wherein the elevator control unit in particular controls a drive unit for moving the elevator car. On the floor, operating units can be provided in particular in the form of call detection units for inputting a floor call. The floor display can indicate to the person the floor at which the elevator car approaching the floor of departure is currently located. Because the floor display is variable and can display different displays such as the aforementioned current car position, the term “dynamic floor display” is also used below.

The door leaf has a floor display, preferably arranged in an edge region and/or corner region, for displaying floor information. The floor information indicates to the person on the floor who called the elevator car the floor at which the elevator car is currently located. This dynamic floor display can additionally or alternatively also be a directional display showing the direction in which the elevator car is currently moving. If a destination call controller is present, the floor display could also indicate after a destination call has been made which destination floor is selected from an input unit located on the floor.

The door leaf has a wall element preferably made of sheet metal for providing the support structure of the door leaf and for covering the shaft access. The wall element can define a front side facing the floor. For the floor display, the wall element has a display segment, preferably arranged in an edge region and/or corner region, having a plurality of light passage openings. For the floor display, at least one controllable light source arranged behind the wall element is installed in the door leaf in the display segment, by means of which at least one light source, after corresponding activation, the display of the floor at which the elevator car is currently located can be achieved.

The door leaf can then have a cover layer that preferably completely covers at least the front side of the wall element that is free or visible in the closed state of the landing door. In this case, the cover layer is configured such that, after activation of the light source for displaying the floor information (e.g. the number corresponding to the floor at which the elevator car is currently located), light penetrates outwards through the light passage opening or the light passage openings such that the person on the floor sees the desired information, and, when the at least one light source is deactivated, the light passage openings are covered to let no light through such that the person on the floor is given the impression of a conventional door leaf. The situation in which the light source is deactivated corresponds to a rest state.

The floor display integrated in this way in the door leaf results in a visually advantageous and assured perception of the display of the desired floor information for the user of the elevator system. This results in an intuitive user guidance relating to the information as to where the car currently is or where it is moving to. In particular when the described cover sheeting is provided, the floor display will stand out by a surprise effect for the first-time user. Initially, nothing can be seen on the landing door, and suddenly, after actuation of the car call, a display can be seen on the door leaf. Thanks to the cover layer, the floor display is vandal-proof and the visible front side of the door leaf can easily be cleaned.

The cover layer can comprise a plastic sheeting, a real wood veneer, a paint layer or a different thin layer made of a material with opaque properties. A laminate is also suitable as the cover layer. The plastic sheeting can be a sheeting made up of one or more layers. The color and surface structure of the cover layer can be selected depending on the aesthetic requirements profile. For example, the plastic sheeting can have the appearance of wood. Plastic wallpapers are also conceivable as cover layers.

Such cover layers are cost-effective and easy to source and use. For example, self-adhesive plastic sheetings can be used that can be attached to the wall element quickly and with little effort. The plastic sheeting for the cover layer can consist, for example, of PE, PP or PVC material.

The cover layer can be less than 1 mm thick. The sheet thickness of the wall element and thus also the depth of the light passage openings can be 1 mm to 5 mm, preferably 1.5 mm to 3 mm. The diameter or the width of the respective light passage opening can be 1.5 to two times larger than the sheet thickness.

The display segment in the wall element having the light passage openings forms a perforated screen structure. The perforated screen structure can, for example, be introduced into the wall element by means of machining methods, punching methods or laser drilling methods. A door leaf with a wall element having a perforated screen structure in the display segment is characterized by favorable visual properties with regard to displaying the floor information, wherein high requirements for the stability and durability of the door leaf are ensured at the same time.

The light passage openings can be oval, circular or rectangular holes or holes with other hole shapes. The visual appearance of the floor display can be influenced by the shape of the light passage openings.

The light passage openings can be created in the wall element by round holes having a diameter of 1 mm to 3 mm. In addition to advantages with regard to the visual appearance of the floor display, such small holes ensure that the cover sheeting cannot be damaged or is difficult to damage by mechanical action from the outside, for example by tampering or vandals.

The display segment can occupy a limited area on the front side of the door leaf, wherein the area assigned to the display segment advantageously occupies at most 20% of the total area of the front side of the door leaf.

The display segment can, for example, be rectangular. The rectangle is preferably oriented in the door leaf such that the sides run horizontally or vertically. The rectangle can have, for example, a width (horizontal side length) of at most 20 cm and a height (vertical side length) of at most 20 cm.

For the floor display, a plurality of light sources arranged on one plane can be installed in the door leaf in the display segment. The light sources can generate white light. It would also be conceivable, however, for the light sources or a portion of the light sources to be color-switchable light sources for generating color effects.

The light source can be an LED. When a plurality of light sources are provided, the light sources can form a planar LED array. The LED array can contain at least one printed circuit board accommodating the LEDs, wherein the printed circuit board is, on its side bearing the LEDs, provided with light-reflecting properties. The LED array can be formed from a plurality of printed circuit board modules equipped with LEDs, wherein the printed circuit board modules can be designed in the shape of strips, for example. To generate color effects, the LED array can be equipped with LEDs that emit light in different color spectra. OLED foils could also be provided instead of an LED array.

An RGB LED can be used as the LED. With such LEDs, the light color can be adjusted or adapted in such a way that, despite the cover sheeting, the desired color ultimately penetrates outwards. Thus, when a plastic sheeting having a wooden appearance is used, an undesired yellow tinge can be prevented from arising if the LED were only to generate white light.

For displaying the floor information, each light source can be individually activatable and deactivatable. The light sources can also be combined into groups, wherein the light sources for displaying the floor information can be activated and deactivated in groups. Floor information can thus be visually displayed easily and quickly. The floor information can be, for example, a number. The floor information could additionally or optionally alternatively be a directional display in the form of an arrow, triangle or "V."

The light source can be positioned directly behind a light passage opening. However, it is also conceivable that the light source could be positioned not directly behind a light passage opening, i.e., be offset to the opening.

A light source can be assigned to a majority of the light passage openings and preferably to each of the light passage openings.

Transparent or translucent plugs for closing the light passage openings can be arranged, in particular used, in the light passage openings. A wall element having such closed light passage openings can also be coated or painted, for example. By applying a lacquer or paint layer, the above-described cover layer can be created in a simple manner.

For efficient operation of the floor display, it can be advantageous if a light guide layer is arranged in the display segment between the at least one light source and the wall element. This light guide layer can be a diffusor film or an acrylic glass plate that emits light.

The plugs for closing the light passage openings can be formed on the light guide layer. The plugs are thus an integral part of the light guide layer and are monolithically connected thereto. The light from the light source runs into the light guide layer, is reflected therein and exits the light guide layer via the light passage openings through the plugs.

The light guide layer can be specified by a common or single component. Alternatively, it can also be advantageous for the light guide layer to be made of a plurality of light guide layer modules.

In particular for the latter case, it can be advantageous if a light source for a plurality of light passage openings is provided in each case, wherein light guide layer modules are assigned to the light passage openings associated in this way.

The door leaf can further comprise an operating unit, in particular an operating unit in the form of a call detection unit for inputting a floor call. With the combination of floor display and operating unit in the same door leaf, user guidance can be optimized again and designed intuitively. In such an arrangement, provision does not have to be made for operating units on the door frame, separate operating terminals or building walls in the floors, which has a positive effect on the installation time and effort of the elevator system. This variant is in addition cost-effective.

Advantageously, the operating unit on the one hand and the floor display on the other hand are placed in the door leaf in regions that are spaced apart from one another. The display region for the floor display can be arranged in an upper region of the door leaf; the operating region assigned to the operating unit can be arranged in a central region of the door leaf. The door leaf, which is rectangular in the front view, can have two longitudinal sides and transverse sides connecting the longitudinal sides to one another, wherein, when the door leaf is installed in the elevator system, the transverse sides extend horizontally and the longitudinal sides extend vertically. For example, the display region for the floor display can be arranged in an upper corner region facing an outer longitudinal side of the door leaf while the operating region assigned to the operating unit is arranged approximately at average height in the region of an inner longitudinal side opposite the outer longitudinal side.

Finally, a further aspect of the invention relates to a door leaf for a landing door of the elevator system described above.

DESCRIPTION OF THE DRAWINGS

Further individual features and advantages of the invention can be derived from the following description of embodiments and from the drawings, in which.

DETAILED DESCRIPTION

Figure 1:
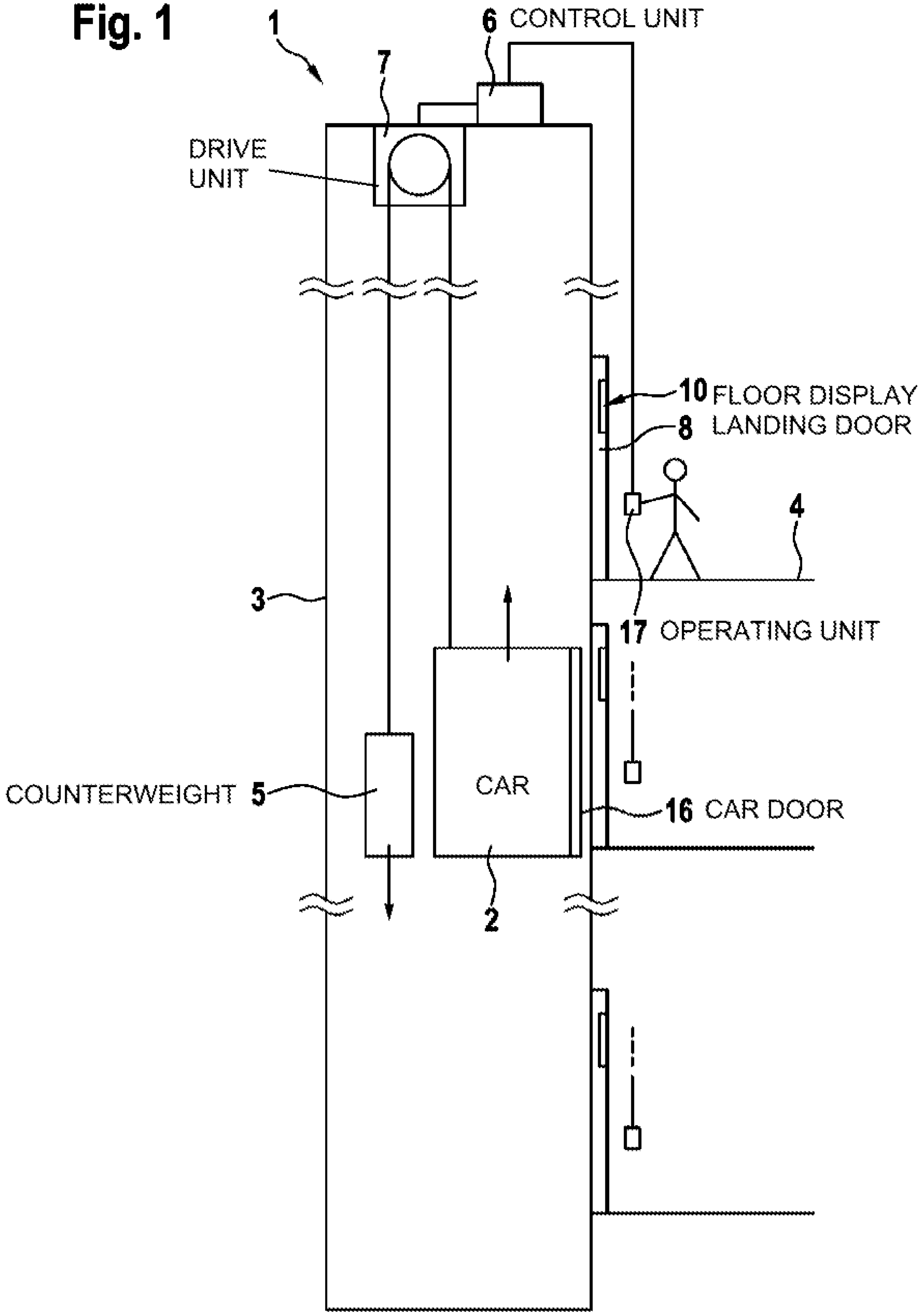
FIG. 1 is a simplified representation of an elevator system in a side view.

FIG. 1 shows an elevator installation or system, denoted by 1, for a multi-story building. The building has one elevator shaft 3 or a plurality of elevator shafts as required. The elevator system 1 shown here contains an elevator car 2 that can be moved vertically up and down in the elevator shaft 3 for transporting people or goods to individual floors. The elevator car 2 has a car door 16. A landing door 8 is associated with each floor 4. The elevator system 1 has a counterweight 5 connected to the elevator car 2 via suspension means (e.g. belts or steel cables). In order to move the elevator car 2 and the counterweight 5, a drive unit 7 is provided that is controlled by an elevator control unit 6. The drive unit 7 (e.g. a traction drive) drives the one or more suspension means and thus moves the car 2 and the counterweight 5 in opposite directions.

The landing door 8 is designed as a floor door of the elevator system 1, closes the elevator shaft 3 and forms the access from the floor 4 to the elevator shaft 3. If the person who is located on the floor 4 wishes to use the elevator, he/she will operate an operating unit denoted by 17, for example, by pressing a button. In the present case, the operating unit 17 is designed as a call detection unit for inputting a floor call. After the floor call, the elevator car 2 moves to the floor at which the person made the floor call. To inform the person waiting for the elevator car 2, the landing door 8 has a floor display 10. The floor display 10 serves to display information about the position of the elevator car, such as the floor at which the elevator car is currently located. Instead of or in addition to this generally numerical display, the floor display 10 can be designed as a directional display. The directional display indicates the direction in which the elevator car is currently moving. The floor display 10 could also indicate that an arrival of an elevator car is imminent, whether an elevator car is currently waiting behind the landing door, whether the elevator car is empty or already fully occupied, where the elevator car will go next, etc.

Figure 2:
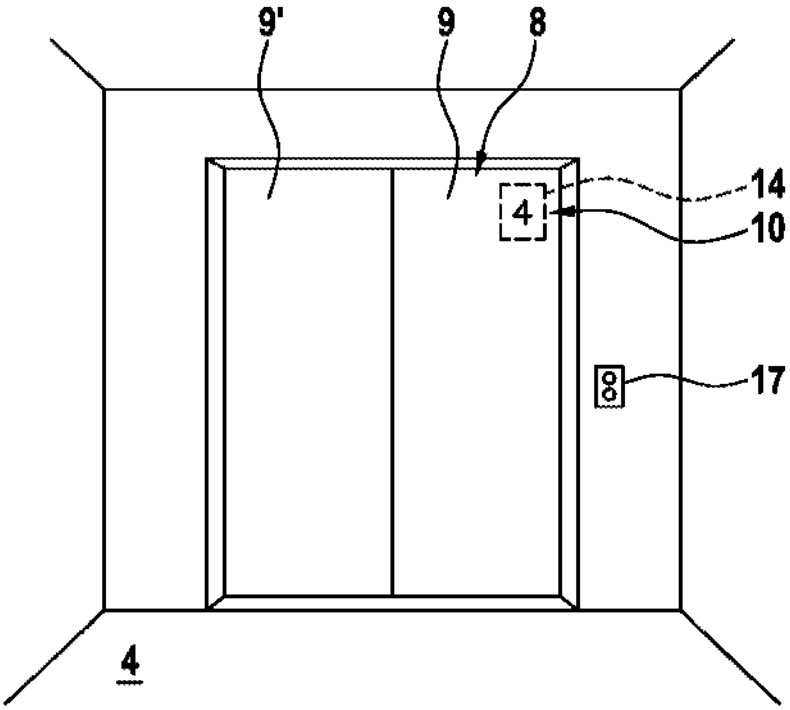
FIG. 2 is a simplified perspective view of a landing door with a door leaf with an activated floor display of the elevator system according to the invention.
Figure 3:
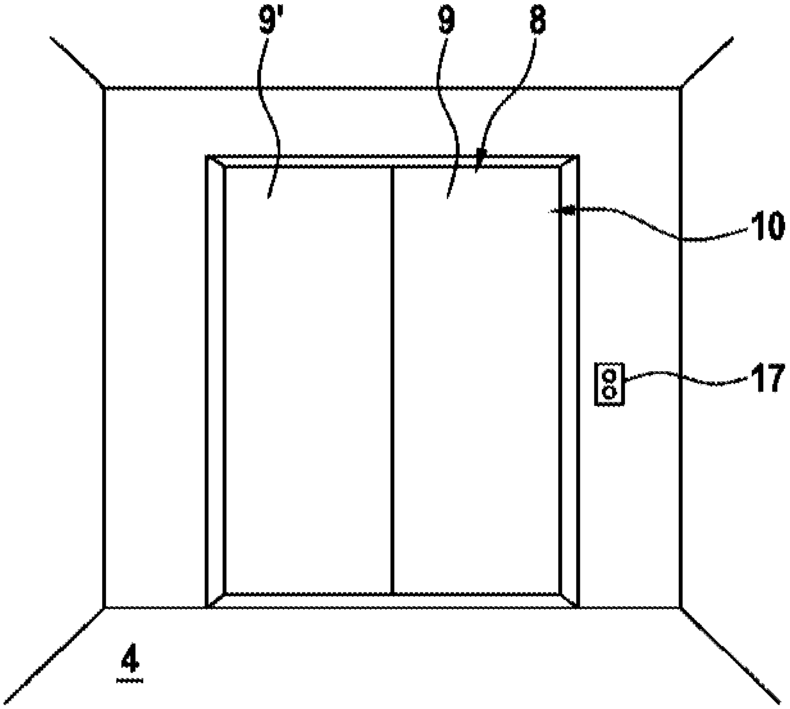
FIG. 3 shows the landing door with the door leaf with a deactivated floor display.

FIGS. 2 and 3 show the landing door 8 from the front from the floor 4. The landing door 8 has two door leaves that can be moved in opposite directions in order to be moved between an open and a closed position. The door leaf denoted by 9, which is located on the right in FIG. 2 of the present embodiment, is equipped with a floor display 10. Of course, the left-hand door leaf denoted by 9' could alternatively be equipped with a floor display 10. It would even be conceivable to equip both door leaves 9, 9' with floor displays 10. For example, the one floor display 10 could then visually indicate a number for the floor at which the elevator car is located, and the other floor display (not shown here) could visually indicate a directional display.

In FIG. 2, the floor display 10 is activated. The floor display 10 is activated via the elevator control unit 6, which outputs the corresponding signals to the floor display 10 (see FIG. 1). The elevator control unit and the floor display 10 can communicate with one another via a wired connection or wirelessly. The car call made by pressing a button of the operating unit 17 is registered in the elevator control unit, whereupon the elevator car starts car travel. The floor display 10 now indicates the floor at which the elevator car is currently located. In FIG. 2, the number "4" is displayed, and the elevator car is consequently located at the fourth floor. The floor display 10 receives the corresponding signals for the floor information from the elevator control unit. In the door leaf 9, at least one controllable light source (not shown here) is installed in a display segment indicated by a dashed rectangle 14. To activate the floor display 10, the at least one light source is brought into an activated state in which the at least one light source is illuminated. The light emitted by the at least one light source, via at least one light passage opening in a wall element of the door leaf 9 and a cover layer attached to the wall element, is finally output as floor information in the manner described in detail below and indicates to the person who is on the floor the floor at which the elevator car is currently located.

A special feature of the floor display 10, which is presented here and integrated in the door leaf 9, is that in the idle state, i.e., when it is not activated, it cannot be recognized at all as such from the outside. This state is shown in FIG. 3. If the at least one light source is deactivated, the light passage openings will be covered by the cover layer so as to let no light through such that the person on the floor is given the impression of a conventional door leaf.

Figure 5:
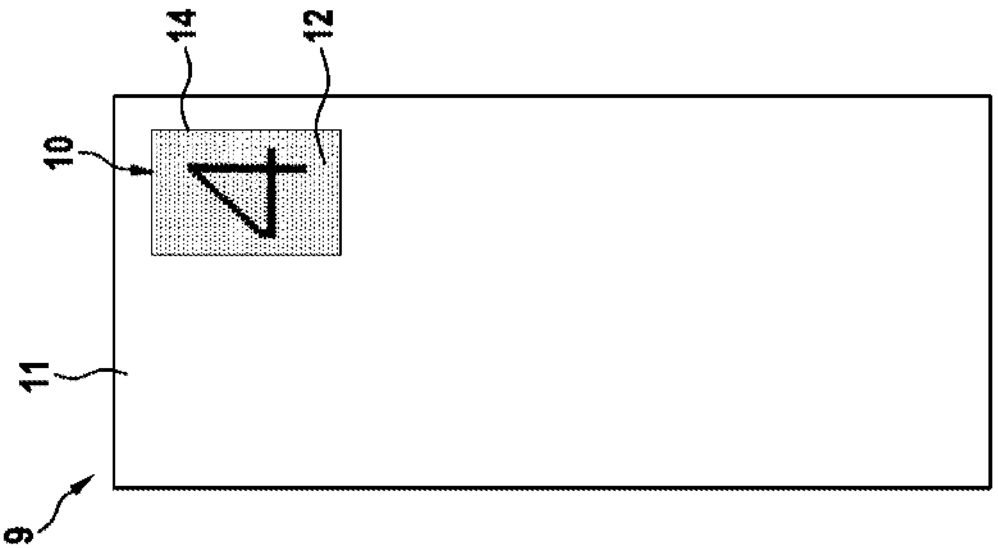
FIG. 5 shows the door leaf (without a cover layer) with an activated floor display.

FIG. 5 shows the door leaf 9 in a front view, wherein the above-mentioned cover layer has been removed for a better understanding of the design. Without the cover layer, the door leaf 9 has a wall element 11 that forms the front side of the door leaf. The wall element 11 is made of sheet metal and provides the support structure of the door leaf. This support structure supports the cover layer (not shown here) and the light sources arranged behind the wall element 11 for generating the floor information. The light sources are arranged in the display segment 14 in the upper right-hand corner region of the wall panel. In the display segment 14, the wall element has a plurality of holes for forming the light passage openings 12. The display segment 14 with the light passage openings 12 clearly has a perforated screen structure. The light passage openings 12 in the perforated screen structure ensure that any numbers, letters or word signs and symbols can be indicated with the floor display 10, wherein the wall element is not unnecessarily weakened such that it can meet high requirements with regard to the mechanical load-bearing capacity.

The display segment 14 occupies a limited area on the front side of the wall element 11 or of the door leaf 9. Advantageously, the area assigned to the display segment 14 occupies at most 20% of the total area of the front side of the door leaf 9. For example, the display segment 14 can be of rectangular configuration as in the present embodiment.

In order for different information to be displayed with the floor display 10, LEDs are used as light sources. These LEDs are arranged behind the wall element 11 and are therefore not shown here. The LEDs can form a planar LED array. OLED foils could also be provided instead of the LED array. The LEDs can be individually activated and deactivated or can be activatable and deactivatable in groups depending on the application.

Figure 4:
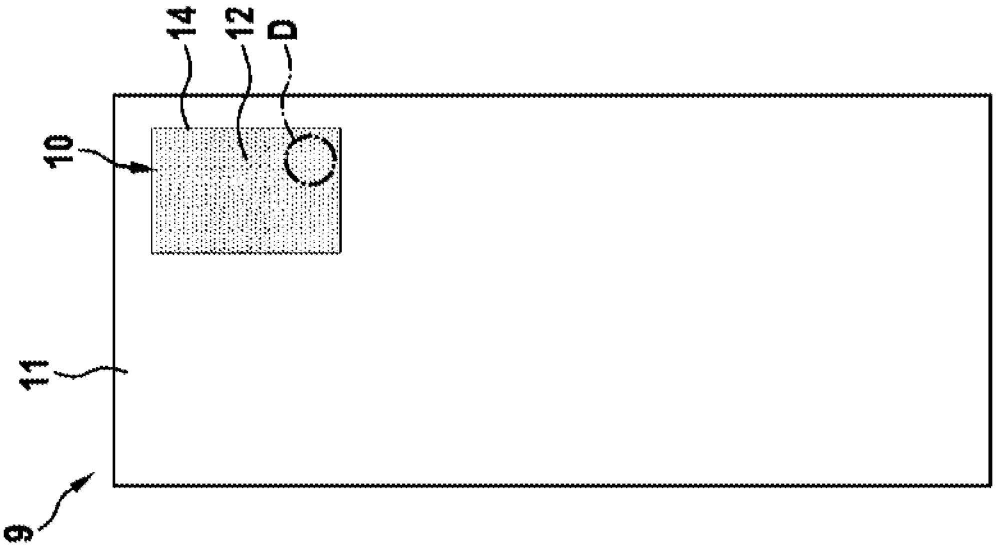
FIG. 4 shows a door leaf (without a cover layer) with a deactivated floor display.
Figure 6:
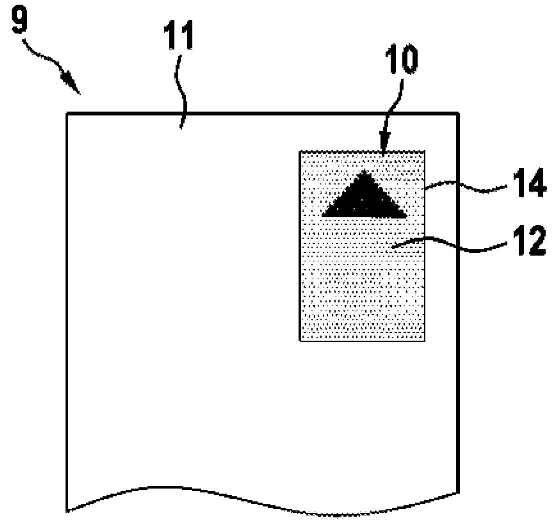
FIG. 6 shows the door leaf (without a cover layer) from FIG. 5 with an activated floor display, wherein the floor display outputs alternative floor information.

In FIG. 4, the LEDs of the floor display 10 are deactivated. In FIGS. 5 and 6, the LEDs of the floor display 10 are in each case activated. In FIG. 5, the floor display 10 shows a "4" as an example of a numerical display of the floor information. As shown by way of example in FIG. 6, the floor display 10 can also be used to display the direction. Instead of the triangle, the direction indicator could also have the shape of an arrow or a "V."

Figure 7:
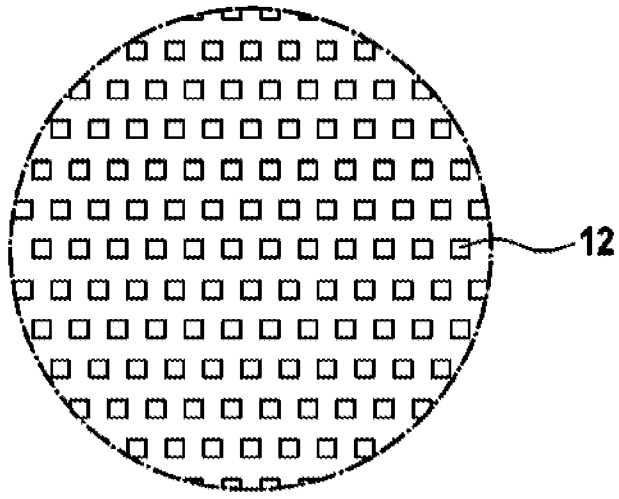
FIG. 7 shows a greatly enlarged detail view of a display segment of the door leaf from FIG. 4 (detail D from FIG. 4) with light passage openings in a perforated screen structure for the floor display.
Figure 8:
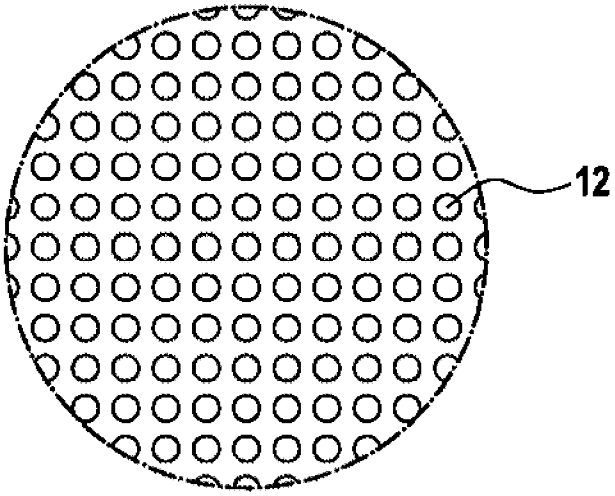
FIG. 8 shows an alternative embodiment of light passage openings in a perforated screen structure for the floor display.

FIG. 7 shows, in a greatly enlarged detail view D from FIG. 4, that the light passage openings 12 form a perforated screen structure. A perforated screen structure is characterized by a large number of holes distributed uniformly in an area. In the present case, the light passage openings 12 are designed as rectangular holes in the wall element 11. As can be seen from FIG. 8, the respective light passage opening 12 can also be a circular hole in the wall element 11. The light passage opening 12 of the perforated screen structure can in each case have a diameter of 1 mm to 3 mm.

Figure 9:
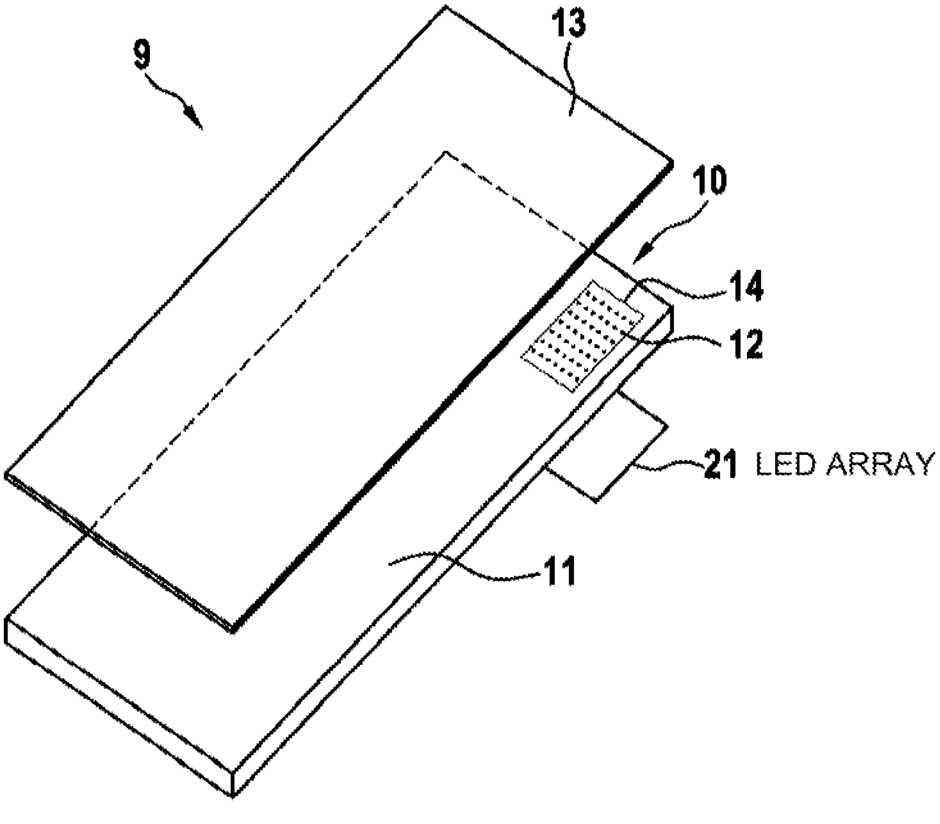
FIG. 9 is a perspective exploded view of a door leaf for the elevator system according to the invention.

Further details regarding the design of a door leaf 9 having an integrated floor display 10 can be found in FIG. 9. The cover layer 13 covers the free or visible front side of the wall element 11 essentially completely. Not shown in the present case for the sake of simplicity are non-visible regions of the wall element 11 adjoining the wall element 11 at the top, which regions, when the door leaf is installed in the elevator system to form, for example, a landing door configured as a sliding door, are also accommodated in a transom or a door frame in the open state.

The cover layer 13 can be a plastic sheeting, a real wood veneer or a lacquer or paint layer. The cover layer 13 can also be a laminate. Suitable materials for the plastic sheeting are, for example, PE, PP or PVC. These plastics are characterized by opaque properties. It can thus be ensured that the light passage openings 12 can be covered to let no light through that is less intense than the light generated by the light sources. However, the cover layer 13 is so thin that light can penetrate through the cover layer 13 after the light sources have been activated. Depending on the material selection, the plastic sheeting can have a sheet thickness of 0.05 to 0.5 mm, for example. The plastic sheeting can be a printed sheeting. For example, a plastic sheeting having a wooden appearance can be selected as the cover layer 13.

The display segment 14 with the light passage openings 12 forming a perforated screen structure is arranged in a corner region of the door leaf 9 or of the wall element 11. If the door leaf 9, which is rectangular in the front view, has two vertical longitudinal sides and transverse sides connecting the longitudinal sides to one another, the display segment 14, as in the present embodiment, can be arranged in the corner region in the upper transverse side and the vertical outer longitudinal side.

An operating unit (not shown) can be integrated in the door leaf 9, for example in the form of a call detection unit for inputting a floor call. In such an arrangement, provision does not have to be made for operating units on the door frame, separate operating terminals or building walls in the floors. The operating region assigned to the operating unit is preferably arranged approximately at average height in the region of an inner longitudinal side opposite the outer longitudinal side.

Below the wall element 11, an LED array denoted by 21 is arranged in the display segment 14. The LED array 21 shown only schematically has a plurality of LEDs as light sources for operating the floor display 10.

Figure 12:
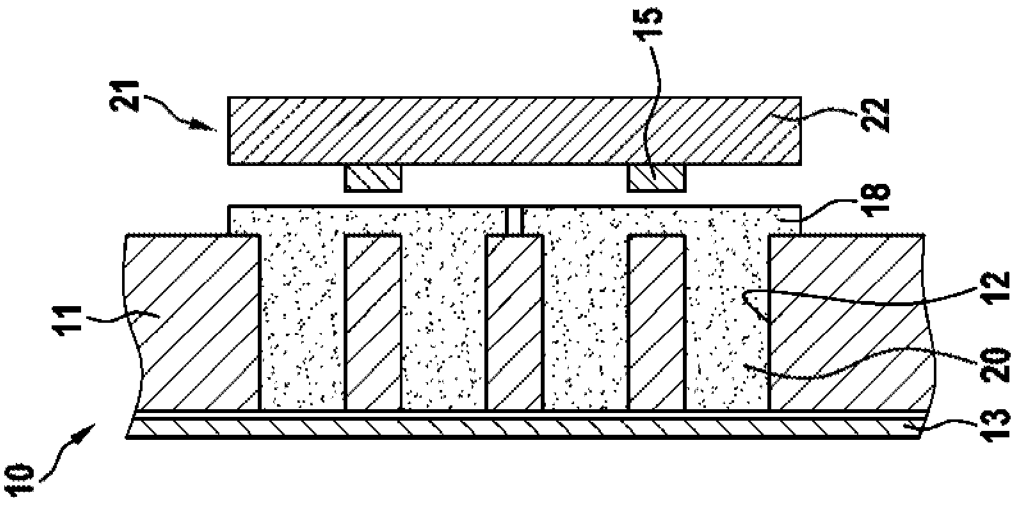
FIG. 12 is a simplified sectional view of a floor display integrated in a door leaf according to a further embodiment.
Figure 11:
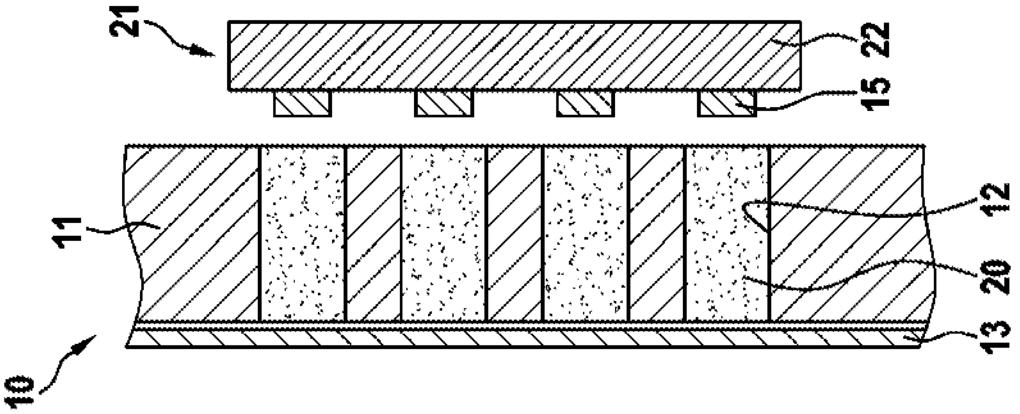
FIG. 11 shows a variant of the floor display of FIG. 10.
Figure 10:
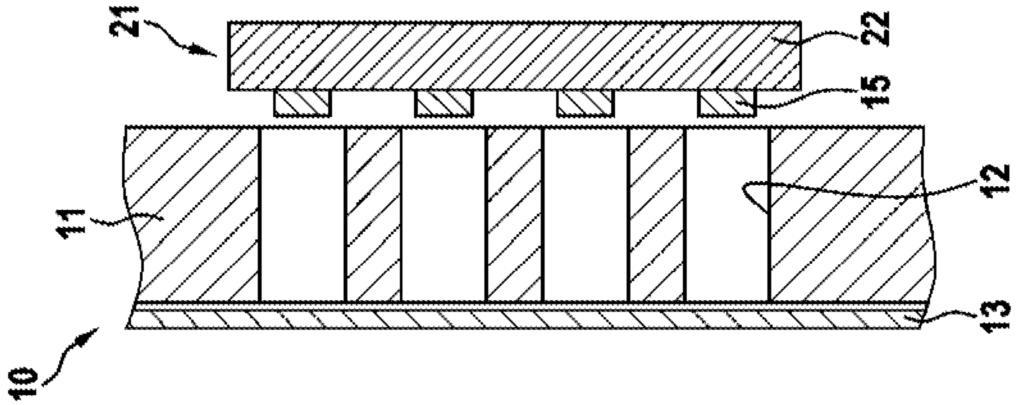
FIG. 10 is a simplified sectional view of a floor display integrated in a door leaf.

Further details on possible developments of the floor display 10 for the landing door can be gathered from FIGS. 10 to 12. The floor display 10 according to FIG. 10 corresponds approximately to the floor display shown in FIG. 9. The LED array 21 comprises a printed circuit board 22 accommodating the LEDs 15. The LEDs are positioned directly behind the light passage openings 12.

FIG. 11 concerns a variant in which transparent or translucent plugs 20 for closing the light passage openings are inserted into or otherwise arranged in the light passage openings 12. The variant having the plugs 20 is also suitable for an adapted variant (not shown here) for the door leaf in which a cover sheeting is dispensed with.

As FIG. 12 shows, an LED 15 does not have to be assigned to each light passage opening 12. By means of light guide layer modules 18, it can be ensured that, after corresponding activation, light from the LEDs 15 still passes outwards via the cover layer 13. In this case, too, it is conceivable to equip the door leaf 9 without the cover layer 13.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system having a landing door with a door leaf at a floor, the landing door providing access from the floor to an elevator car in an elevator shaft, the door leaf comprising:

a wall element forming a support structure of the door leaf and covering at least a portion of a shaft access to the elevator shaft when in a closed position, the wall element having a front side facing the floor and a rear side facing the elevator shaft;

wherein the wall element has a display segment with a plurality of light passage openings, the display segment being included in a floor display adapted to display a current position of the elevator car as floor information indicating to a person on the floor a floor at which the elevator car is currently located;

wherein the floor display includes a controllable light source arranged behind the wall element at the rear side, the light passage openings forming a perforated screen structure letting light from the light source when activated through the wall element such that the person sees the floor information at the front side; and wherein door leaf includes a cover layer on the front side of the wall element, wherein light from the activated light source passes through the light passage openings and penetrates outwards through the cover layer such that the person sees the floor information, and when the light source is deactivated, the cover layer does not let light through that is less intense than the light generated by the light source.

2. The elevator system according to claim 1 wherein the wall element is made of sheet metal.

3. The elevator system according to claim 1 wherein the cover layer is made of a material having opaque properties.

4. The elevator system according to claim 1 wherein the light passage openings are formed as round holes in the wall element having a diameter of 0.5 mm to 8 mm.

5. The elevator system according to claim 1 wherein the light passage openings are formed as round holes in the wall element having a diameter of 1 mm to 5 mm.

6. The elevator system according to claim 1 wherein the display segment is arranged in an edge region and/or a corner region of the door leaf.

7. The elevator system according to claim 1 wherein the display segment occupies no more than 20% of a total area of the front side of the wall element.

8. The elevator system according to claim 1 wherein the controllable light source is an array of individual light sources arranged on a plane installed on the rear side of the wall element.

9. The elevator system according to claim 8 wherein the individual light sources are each an LED and the LEDs form a planar LED array.

10. The elevator system according to claim 1 including transparent or translucent plugs arranged in the light passage openings.

11. The elevator system according to claim 10 including a light guide layer arranged in the display segment between the controllable light source and the wall element, and wherein the plugs are formed on the light guide layer.

12. The elevator system according to claim 11 wherein the controllable light source is an array of individual light sources and the light guide layer includes at least two modules each having at least two of the plugs formed thereon, each of the modules is associated with a different one of the individual light sources.

13. The elevator system according to claim 1 wherein the controllable light source is an array of individual light sources and each of the light passage openings is associated with one of the individual light sources.

14. The elevator system according to claim 1 including a control unit and an operating unit for inputting a call, the floor display and the operating unit communicating with the control unit to display the floor information in response to registration of a call.

15. A door leaf for a landing door of an elevator system, the door leaf comprising:

a wall element forming a support structure of the door leaf and adapted to cover at least a portion of a shaft access to an elevator shaft when in a closed position, the wall element having a front side and a rear side;

wherein the wall element includes a floor display adapted to display a current position of an elevator car as floor information at the front side;

wherein the floor display includes a display segment with a plurality of light passage openings and a controllable light source arranged behind the wall element at the rear side, the light passage openings forming a perforated screen structure letting light from the light source when activated through the wall element to the front side; and a cover layer on the front side of the wall element, wherein light from the activated light source passes through the light passage openings and penetrates outwards through the cover layer to display the floor information, and when the light source is deactivated, the cover layer does not let light through that is less intense than the light generated by the light source.

* * * * *